United States Patent
Rácz et al.

(10) Patent No.: US 12,341,842 B2
(45) Date of Patent: Jun. 24, 2025

(54) TECHNIQUE FOR ANALYZING QoE OF A DELAY CRITICAL ROBOTIC APPLICATION

(71) Applicant: Telefonaktiebolaget LM Ericsson (publ), Stockholm (SE)

(72) Inventors: Sándor Rácz, Cegléd (HU); Attila Báder, Paty (HU); Geza Szabo, Kecskemét (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/773,919

(22) PCT Filed: Nov. 4, 2019

(86) PCT No.: PCT/EP2019/080118
§ 371 (c)(1),
(2) Date: Sep. 19, 2022

(87) PCT Pub. No.: WO2021/089113
PCT Pub. Date: May 14, 2021

(65) Prior Publication Data
US 2022/0402137 A1 Dec. 22, 2022

(51) Int. Cl.
*H04L 65/80* (2022.01)
*B25J 9/16* (2006.01)
(Continued)

(52) U.S. Cl.
CPC ............ *H04L 65/80* (2013.01); *B25J 9/1666* (2013.01); *B25J 9/1676* (2013.01); *B25J 13/006* (2013.01);
(Continued)

(58) Field of Classification Search
CPC ...... B25J 9/1676; B25J 9/1666; B25J 13/006; B25J 9/1674; H04L 43/0841;
(Continued)

(56) References Cited

U.S. PATENT DOCUMENTS

| | | | |
|---|---|---|---|
| 7,826,984 B2 * | 11/2010 | Sjostrand | ............... B25J 9/1674 |
| | | | 702/33 |
| 11,140,051 B2 * | 10/2021 | Báder | ................... H04L 67/125 |

(Continued)

FOREIGN PATENT DOCUMENTS

| | | | | |
|---|---|---|---|---|
| EP | 3735761 B1 * | 3/2022 | ............. | H04L 43/04 |
| TW | 202415506 A * | 4/2024 | ............ | B25J 9/1669 |

(Continued)

OTHER PUBLICATIONS

Motion Planner Augmented Reinforcement Learning (Year: 2020).*
(Continued)

*Primary Examiner* — Kyle T Johnson
(74) *Attorney, Agent, or Firm* — Murphy, Bilak & Homiller, PLLC

(57) ABSTRACT

A technique for analyzing Quality of Experience, QoE, of a delay critical robotic application in a cloud robotics system is disclosed, the robotic application involving use of a cloud based service by a robot, the service being provided to the robot from a cloud using a connection over a mobile communication network. A method implementation of the technique comprises triggering (S202) determining whether a QoE measure associated with the robotic application exceeds a threshold to assess whether QoE degradation is present, and, when it is determined that QoE degradation is present, triggering (S204) identifying a root cause for the QoE degradation based on one or more performance indicators observed within the mobile communication network and associated with the connection.

20 Claims, 6 Drawing Sheets

(51) Int. Cl.
*B25J 13/00* (2006.01)
*H04L 43/08* (2022.01)
*H04L 43/0829* (2022.01)
*H04L 43/087* (2022.01)
*H04L 67/125* (2022.01)

(52) U.S. Cl.
CPC ........ *H04L 43/0841* (2013.01); *H04L 43/087* (2013.01); *H04L 67/125* (2013.01); *H04L 43/08* (2013.01)

(58) Field of Classification Search
CPC ... H04L 43/087; H04L 43/08; H04L 41/0631; H04L 67/125; H04L 41/5067; H04L 43/16; H04L 65/80; H04W 24/02; H04W 24/10; H04W 4/70; H04W 4/90; H04W 24/04; G05B 2219/39412; G05B 2219/40519
See application file for complete search history.

(56) References Cited

U.S. PATENT DOCUMENTS

| | | | | |
|---|---|---|---|---|
| 11,590,660 | B2* | 2/2023 | Freeman | G01S 17/88 |
| 2005/0080799 | A1* | 4/2005 | Harnden | H04L 63/0823 |
| 2005/0216302 | A1* | 9/2005 | Raji | G05B 11/012 |
| | | | | 705/26.1 |
| 2010/0148940 | A1* | 6/2010 | Gelvin | H01Q 9/0464 |
| | | | | 340/286.02 |
| 2014/0052706 | A1* | 2/2014 | Misra | G06F 16/1837 |
| | | | | 707/698 |
| 2016/0182309 | A1* | 6/2016 | Maturana | G05B 19/41885 |
| | | | | 709/224 |
| 2016/0241429 | A1* | 8/2016 | Froehlich | H04L 41/0631 |
| 2017/0285622 | A1* | 10/2017 | Figoli | H04L 69/26 |
| 2017/0297198 | A1* | 10/2017 | Lawrence, III | B25J 9/1664 |
| 2018/0176111 | A1* | 6/2018 | Lopes | H04W 24/08 |
| 2018/0288774 | A1* | 10/2018 | Karjee | H04W 72/542 |
| 2018/0302813 | A1* | 10/2018 | Hahn | H04W 36/08 |
| 2019/0099886 | A1* | 4/2019 | Chattopadhyay | G05B 23/024 |
| 2020/0252838 | A1* | 8/2020 | Akdeniz | H04W 36/0061 |
| 2020/0259896 | A1* | 8/2020 | Sachs | H04W 56/0065 |
| 2020/0348662 | A1* | 11/2020 | Cella | G05B 19/41865 |
| 2021/0138655 | A1* | 5/2021 | Mousavian | B25J 9/161 |
| 2022/0021469 | A1* | 1/2022 | Veijalainen | H04B 17/29 |
| 2022/0105629 | A1* | 4/2022 | Natarajan | G05B 19/4189 |
| 2022/0141139 | A1* | 5/2022 | Wong | H04L 41/5003 |
| | | | | 709/223 |
| 2022/0152826 | A1* | 5/2022 | Danielczuk | G06V 10/82 |
| 2022/0402137 | A1* | 12/2022 | Rácz | H04L 43/0841 |
| 2023/0032652 | A1* | 2/2023 | Jeong | H04W 72/1263 |

FOREIGN PATENT DOCUMENTS

| | | | | |
|---|---|---|---|---|
| WO | WO-2017116853 | A1* | 7/2017 | ........ H04B 17/318 |
| WO | 2019134733 | A1 | 7/2019 | |

OTHER PUBLICATIONS

Deep Reinforcement Learning for Collision Avoidance of Robotic Manipulators (Year: 2018).*
Real Time Obstacle Avoidance for Manipulators (Year: 1986).*
Path Planning for Intelligent Robots Based on Deep Q Learning (Year: 2020).*
TW 202415506 translation (Year: 2024).*
3GPP, "3rd Generation Partnership Project; Technical Specification Group Services and System Aspects; System Architecture for the 5G System (5GS); Stage 2 (Release 16)", 3GPP TS 23.501 V16.2.0, Sep. 2019, pp. 1-391.
Németh, B., et al., "Fast and Efficient Network Service Embedding Method with Adaptive Offloading to the Edge", 2018 IEEE Conference on Computer Communications Workshops (INFOCOM WKSHPS): IECCO: Integrating Edge Computing, Caching, and Offloading in Next Generation Networks, Honolulu, HI, 2018, pp. 178-183.

* cited by examiner

TECHNIQUE FOR ANALYZING QoE OF A DELAY CRITICAL ROBOTIC APPLICATION

TECHNICAL FIELD

The present disclosure generally relates to cloud robotics systems. In particular, a technique for analyzing Quality of Experience (QoE) of a delay critical robotic application in a cloud robotics system is presented. The technique may be embodied in methods, computer programs, apparatuses and systems.

BACKGROUND

Production systems in the age of the 4th Industrial Revolution are envisioned to be flexible, scalable and easily reconfigurable supporting product independency, universal manufacturing processes and capacity scaling depending on current demand. Human Robot Collaboration (HRC) typically forms an essential part of such systems and combines human's craftsmanship and cognitive skills with the precision and strength of robots. HCR systems are regulated by safety standards to prevent accidents, but these standards may also lead to degradation in productivity. In an emergency situation, a collaborative robot ensuring safety in an HRC environment can enter states, such as emergency stop, safeguard stop, protective stop, idle, and disconnected, for example. All these states have in common that the robot does not perform any productive work while residing in these states and, to improve productivity, the time spent in any of these states should therefore be minimized.

A key element impacting productivity is the movement of robots. A sophisticated control of robot trajectories can therefore increase productivity while still meeting the safety requirements. An important capability to ensure safety is collision avoidance, which includes the detection of potential collisions while following given trajectories and the calculation of detour trajectories. To this end, digital twins may be used as one way to test the impact of different control decisions in a simulated virtual environment (rather than moving the physical robots themselves), e.g., to calculate several control options and test them with respect to future consequences. The operation of digital twins may require excessive computational resources, however, especially when several (e.g., hundreds or thousands of) decisions are to be simulated simultaneously with strict latency constraints. In cloud robotics systems, the required computational power can be provided by cloud computing environments (or simply "clouds"), but at the cost of higher delay and jitter, especially when mobile communication networks (e.g., 5G networks) are used for connectivity between robots and the cloud systems. The transmission quality over radio interfaces of a mobile communication network may be critical from a performance point of view as it may strongly depend on the actual radio conditions, which can vary extensively. For delay critical robotic applications, this may be problematic.

When relying on the cloud for latency critical applications, cloud management systems generally do not have any information about the actual radio conditions as well as the expected delay/degradation, neither in the radio interface nor in the core network. Also, the cloud environment may itself contribute to the end-to-end delay depending on its internal operations. Edge and fog computing are emerging concepts which extend traditional cloud computing by deploying compute resources closer to customers and end devices. An essential feature of edge computing, for example, is that strict delay requirements can be met, but the delay generated by the internal operation of the cloud computing environment may still prevail.

SUMMARY

Accordingly, there is a need for a technique which improves the handling of deadline critical robotic applications in cloud computing systems, especially when alternative trajectories are calculated in the cloud, and which avoids one or more of the problems discussed above, or other problems.

According to a first aspect, a method for analyzing QoE of a delay critical robotic application in a cloud robotics system is provided, the robotic application involving use of a cloud based service by a robot, the service being provided to the robot from a cloud using a connection over a mobile communication network. The method comprises triggering determining whether a QoE measure associated with the robotic application exceeds a threshold to assess whether QoE degradation is present, and, when it is determined that QoE degradation is present, triggering identifying a root cause for the QoE degradation based on one or more performance indicators observed within the mobile communication network and associated with the connection.

The QoE measure may be determined based on information provided by a QoE monitoring system observing a performance of the robot. The QoE measure may be representative of at least one of an observed reaction time of the robot, an observed number of emergency stops of the robot caused by missed deadlines for calculating detour trajectories avoiding impending collisions of the robot, an observed number of detour trajectories calculable within a specific amount of time, optionally within deadlines for calculating detour trajectories avoiding impending collisions of the robot, and an observed available delay budget for performing corrective actions for resolving the QoE degradation.

Identifying the root cause for the QoE degradation may include determining, for at least one of the one or more performance indicators, whether the respective performance indicator exceeds a performance threshold. The one or more performance indicators may be determined based on event information collected within the mobile communication network. The event information may comprise performance related information concerning at least one of a Radio Access Network (RAN) of the mobile communication network, a user plane of a Core Network (CN) of the mobile communication network, a control plane of the CN of the mobile communication network, and the cloud.

The performance related information concerning the RAN may comprise at least one of radio condition related information, handover related information, context setup related information, and traffic report related information. The performance related information concerning the user plane of the CN may comprise transport related information regarding at least one of: packet loss, round trip time, and jitter. The performance related information concerning the control plane of the CN may comprise at least one of session setup related information, 5G Quality of Service (QoS) Indicator (5QI) related information, Cell Trace User Equipment (UE) Mapping (CTUM) related information. The performance related information concerning the cloud may comprise information regarding a computing performance of the cloud.

Collecting the event information may include correlating event information obtained from a plurality of sources within the mobile communication network. The plurality of sources may be located in different domains of the mobile communication network. The one or more performance indicators may be determined based on network configuration information available in the mobile communication network.

The method may further comprise triggering performing one or more corrective actions to resolve the QoE degradation. The one or more corrective actions may include implementing a resource reallocation in at least one network domain in which the root cause for the QoE degradation is identified, the resource reallocation being adapted to provide sufficient QoE for an orderly operation of the robotic application. When the root cause for the QoE degradation is an improper 5QI mapping, the one or more corrective actions may include changing the 5QI mapping to a value appropriate to provide sufficient QoE for an orderly operation of the robotic application.

The service provided to the robot from the cloud may include calculating detour trajectories avoiding impending collisions of the robot. For each detour trajectory among the detour trajectories to be calculated, a deadline may be determined indicating until when the respective detour trajectory is to be provided to the robot. Each detour trajectory among the detour trajectories to be calculated may be defined to be started from a different starting point on a currently executed trajectory of the robot. The deadline for the respective detour trajectory may be prior to a time of reaching the starting point of the respective detour trajectory on the currently executed trajectory of the robot. The robot may discard the respective detour trajectory when the deadline for providing the respective detour trajectory to the robot is missed. The one or more corrective actions may be performed to ensure that the determined deadlines for the detour trajectories are not missed.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for analyzing QoE of a delay critical robotic application in a cloud robotics system is provided, the robotic application involving use of a cloud based service by a robot, the service being provided to the robot from a cloud using a connection over a mobile communication network. The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
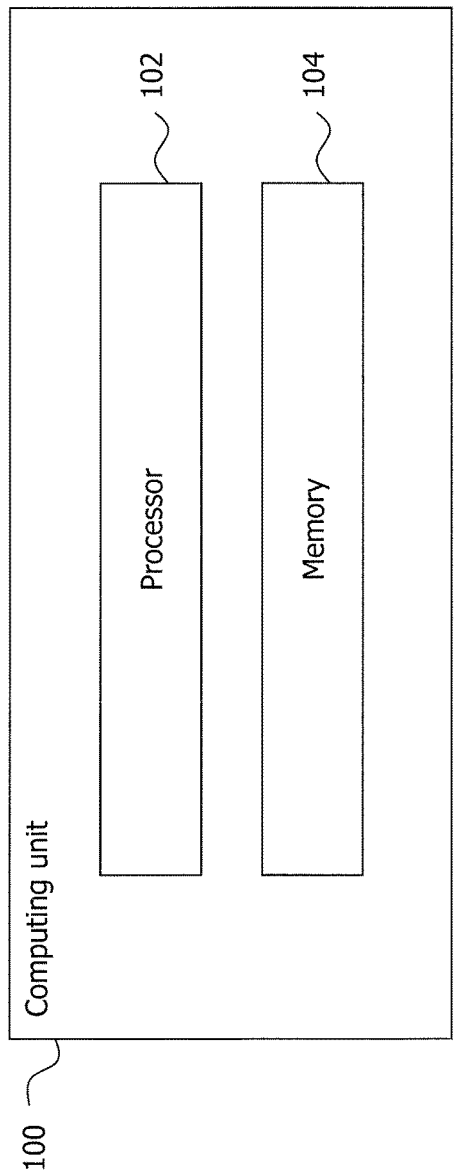
FIG. 1 illustrates an exemplary composition of a computing unit for analyzing QoE of a delay critical robotic application in a cloud robotics system according to the present disclosure.

FIG. 1 schematically illustrates an exemplary composition of a computing unit 100 for analyzing QoE of a delay critical robotic application in a cloud robotics system, the robotic application involving use of a cloud based service by a robot, the service being provided to the robot from a cloud using a connection over a mobile communication network. The computing unit 100 comprises at least one processor 102 and at least one memory 104, wherein the at least one memory 104 contains instructions executable by the at least one processor 102 such that the computing unit 100 is operable to carry out the method steps described herein below.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
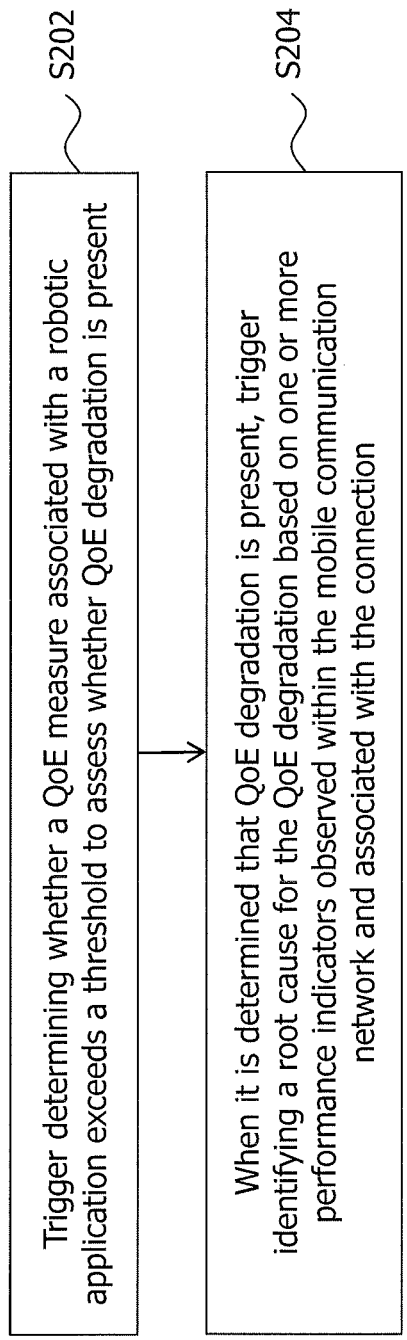
FIG. 2 illustrates a method which may be performed by the computing unit according to the present disclosure.

FIG. 2 illustrates a method which may be performed by the computing unit 100 according to the present disclosure. The method is dedicated to analyzing QoE of a delay critical robotic application in a cloud robotics system, wherein the robotic application involves use of a cloud based service by a robot, and wherein the service is provided to the robot from a cloud using a connection over a mobile communication network. In step S202, the computing unit 100 may trigger determining whether a QoE measure associated with the robotic application exceeds a threshold to assess whether QoE degradation is present. In step S204, when it is determined that QoE degradation is present, the computing unit 100 may trigger identifying a root cause for the QoE degradation based on one or more performance indicators observed within the mobile communication network and associated with the connection.

The method performed by the computing unit 100 may be seen as an analytics technique usable for assuring QoE of delay critical robotic applications. Delay critical robotic applications may correspond to robotic applications whose orderly operation depends on the adherence to (e.g. hard) deadlines (or "time requirements") with respect to the arrival of messages (e.g., robot control commands or other messages) associated with the service being provided to the robot from the cloud, i.e., where the arrival of messages after lapse of the deadline may result in QoE degradation or even malfunction of the robot, for example. Delay critical robotic applications may as such also be denoted as "deadline critical robotic applications" or "latency critical robotic applications". The "cloud" may correspond to a cloud computing environment in which the service being provided to the robot is executed.

As known to one skilled in the art, the term "QoE" may relate to a measure of satisfaction of a user's experience with respect to the use of an application or service. QoE may generally be distinguished from QoS, which rather attempts to objectively measure service parameters on the media or network level only, such as packet loss rates or average throughput, without particular consideration of the user's needs. While QoE is typically used as a measure for user related services, such as the quality of web browsing, phone calls or TV broadcasts, for example, according to the technique presented herein, the concept of QoE may be extended to the performance of delay critical applications of robots being served from the cloud. The QoE measure may as such be a measure which is indicative of a performance of the robot, such as the observed reaction time of the robot, for example.

As the service may be provided to the robot from the cloud using a connection over a mobile communication network, such as a 5G network, QoE degradation may occur due to issues on the radio interface (e.g., due to changing radio conditions), in the core network (e.g., due to latencies caused on the user plane or the control plane of the core network) of the mobile communication network as well as in the cloud (e.g., due to insufficient computational resources allocated to the service in the cloud), for example. In order to be able to ensure an orderly operation of the delay critical robot application, according to the technique presented herein, a two step approach of determining a root cause for an observed QoE degradation is proposed in accordance with steps S202 and S204.

According to step S202, it may be determined whether QoE degradation is observable with respect to an orderly operation of the robotic application. The presence of QoE degradation may be assessed with respect to a QoE measure being indicative of a performance of the robot. In order to assess whether QoE degradation is present, it may be determined whether the QoE measure exceeds a threshold and, if the threshold is exceeded, it may be concluded that QoE degradation is present.

The formulation "exceeding a threshold" may be understood in the sense of both exceeding a threshold setting an upper limit (in which case the QoE measure exceeds the threshold when the QoE measure becomes greater than the threshold) and exceeding a threshold setting a lower limit (in which case the QoE measure exceeds the threshold when the QoE measure falls below the threshold). The QoE measure may also be denoted as a Key Performance Indicator (KPI) which triggers the threshold. The threshold may be configurable (e.g., depending on the use case) or may be set fixedly by an operator of the mobile network, for example.

As said, the QoE measure may be indicative of a performance of the robot. The QoE measure may be determined based on information provided by a QoE monitoring system (e.g., external to or provided within the mobile communication network) observing a performance of the robot. For example, the QoE measure may be representative of at least one of an observed reaction time of the robot, an observed number of emergency stops of the robot caused by missed deadlines to be complied with, e.g., deadlines for calculating detour trajectories avoiding impending collisions of the robot, an observed number of detour trajectories calculable within a specific amount of time, optionally within the deadlines to be complied with, e.g., deadlines for calculating detour trajectories avoiding impending collisions of the robot, and an observed available delay budget for performing corrective actions for resolving the QoE degradation. As a mere example, it may be determined that QoE degradation is present if the reaction time of the robot is <0.01 seconds and/or if the number of detour trajectories calculable within a certain time budget is <100.

When, as a result of step S202, it is determined that QoE degradation is present, a root cause for the QoE degradation may be identified in accordance with step S204. The root cause of the QoE degradation, e.g., the source of the issue on network level, may be identified based on one or more performance indicators observed within (the boundaries of) the mobile communication network and associated with the connection by which the service is provided to the robot from the cloud. The root cause may be assessed with respect to the one or more performance indicators, such as KPIs observed within the mobile communication network. Identifying the root cause for the QoE degradation may include determining, for at least one of the one or more performance indicators, whether the respective performance indicator exceeds a performance threshold. The formulation "exceeding a performance threshold" may be understood in the sense of both exceeding a performance threshold setting an upper limit (in which case the respective performance indicator exceeds the performance threshold when the respective performance indicator becomes greater than the performance threshold) and exceeding a performance threshold setting a lower limit (in which case the respective performance indicator exceeds the performance threshold when the respective performance indicator falls below the performance threshold). Each of the one or more performance indicators may thus correspond to a KPI which triggers the performance threshold.

As the QoE measure may be used as a KPI to determine the QoE observed on application level and the one or more performance indicators may be used as KPIs to determine root causes on network level, the QoE measure may also be denoted as high-level KPI and the one or more performance indicators may also be denoted as low-level KPIs. If QoE degradation is thus identified in a first step using high-level KPIs, low-level KPIs may be calculated in a second step to identify the network domain which is the source of the issue and to determine the corresponding root cause.

Figure 3:
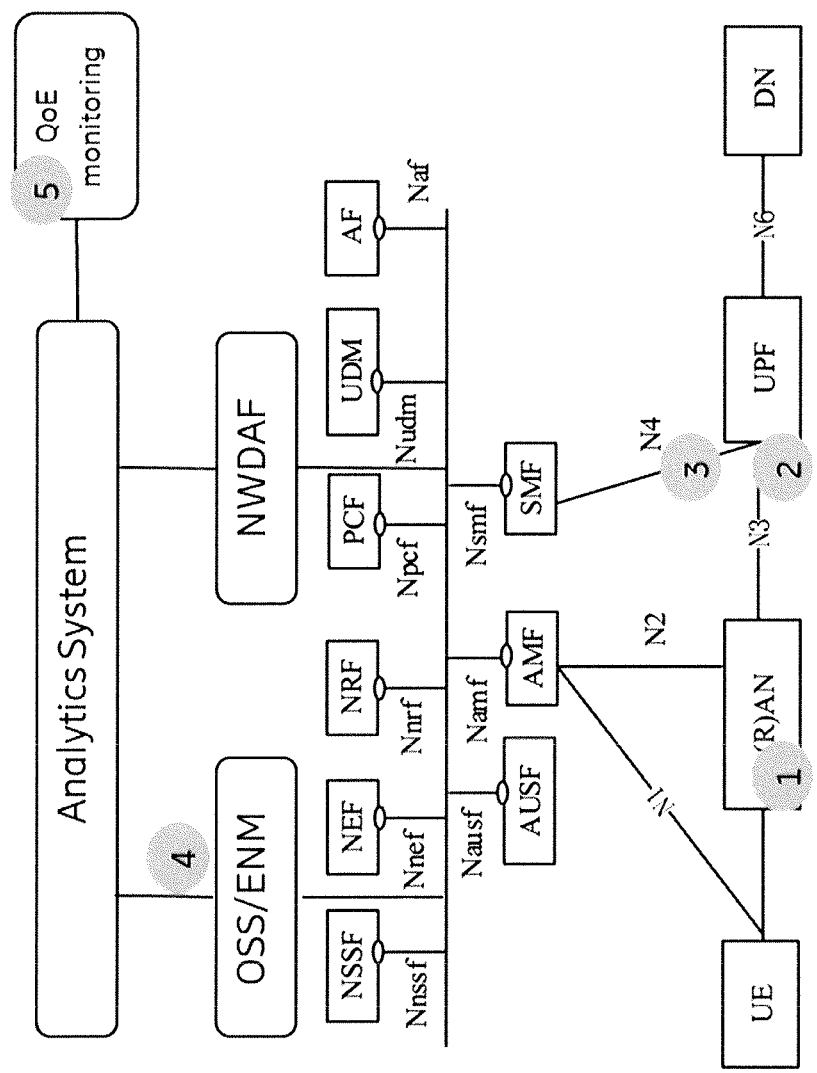
FIG. 3 illustrates an exemplary 5G network architecture with capturing reference points at different domains of the network.

The one or more performance indicators may be determined based on event information collected within the mobile communication network, such as performance events collected at capturing reference points within the mobile communication network. FIG. 3 illustrates an exemplary 5G network architecture having capturing reference points (1) in the RAN, (2) at the user plane of the CN, and (3) at the control plane of the CN. Each of the capturing points may collect event information in its own domain of the network. The event information may thus comprise performance related information concerning at least one of a RAN of the mobile communication network, a user plane of the CN of the mobile communication network, a control plane of the CN of the mobile communication network. Additionally or alternatively, the event information may also comprise performance related information concerning the cloud. Such information may be gathered at capturing reference point (2), for example, by analyzing user plane data and deriving respective delays caused by the cloud.

The performance related information concerning the RAN may be gathered from base station (or "radio node") logs or events, such as from eNodeB (eNB) or next generation NodeB (gNB) logs, for example. More specifically, the performance related information concerning the RAN may comprise at least one of radio condition related performance information (e.g., information indicative of a quality of the radio environment, such as a Reference Signals Received Power (RSRP), Reference Signal Received Quality (RSRQ), Channel Quality Indicator (CQI), Hybrid Automatic Repeat Request (HARQ) rate, Signal to Interference and Noise Ratio (SINR), or the like), handover related performance information (e.g., information regarding handover request, preparation, execution, success, time and mobility evaluation reports, e.g., provided by a mobility management node, such as an Access and Mobility Function (AMF)), context setup related performance information (e.g., information regarding context setup and release), and traffic report related performance combination (e.g., information regarding UE traffic reports or cell traffic reports), for example. The radio condition related performance information may be provided regarding uplink (UL) and/or downlink (DL) sides. For example, in DL direction, the RSRP and RSRQ characterizing the signal strength and quality may be collected and, in UL direction, events reporting the power restriction measure and the SINR may be collected.

The performance related information concerning the data plane of the CN may correspond to packet level information gathered by probes at the user plane, for example. More specifically, the performance related information concerning the data plane of the CN may comprise transport related performance information regarding at least one of packet loss, round trip time (RTT), and jitter, e.g., on UE and/or Data Network (DN) side. Additionally or alternatively, the transport related information may comprise information regarding an employed transport protocol, such as the Transmission Control Protocol (TCP), Real-Time Transport Protocol (RTP) or Quick User Datagram Protocol (UDP) Internet Connections (QUIC), for example. A probe may be installed at the Packet Data Network (PDN) Gateway (PGW) or User Plane Function (UPF) interface and capture user plane traffic to provide type, content and timing information on request and response messages sent between the robot and the service in the cloud, for example.

The performance related information concerning the control plane of the CN may comprise at least one of session related performance information (e.g., session ID, session setup, modification, termination, or the like), 5QI related performance information (e.g., a 5QI value indicative of one or more QoS characteristics, e.g., as defined in 3GPP TS 23.501 v16.2.0, for example), and CTUM related performance information, for example. The performance related information concerning the cloud, on the other hand, may comprise information regarding a computing performance of the cloud cell. As mentioned above, such information may be gathered by analyzing user plane data and deriving respective delays caused by the cloud, for example.

As said, the root cause for the QoE degradation may be identified by determining whether a respective performance indicator exceeds a corresponding performance threshold. As a mere example, to identify radio issues, radio environment related data may be aggregated per cell and it may be determined that the root cause is a radio coverage issue in the RAN if the aggregated RSRP is <−120 dBm, or that the root cause is an interference issue in the RAN if the aggregated RSRQ <−15 dB. A handover issue may be identified, for example, if the handover execution time is >100 ms, or if the handover success rate is <95%. Transport issues on the user plane may be identified based on packet level parameters, e.g., when packet loss is >5%, or when the RTT is >100 ms. In case the respective performance indicator is not representative of a numerical value, such as in case of a 5QI value mapping to one or more QoS characteristics, the root cause for the QoE degradation may be identified without comparison to a threshold. As an example, QoS issues may be identified by detecting an improper 5QI mapping associated with the service, i.e., a 5QI mapping that does not provide the QoS characteristics required for an orderly operation of the robotic application.

As said, the one or more performance indicators may be determined based on event information collected within the mobile communication network. The event information may be gathered from various sources within the mobile communication network, such as from sources (1), (2) and (3) shown in FIG. 3, for example. Collecting the event information may thus include correlating event information obtained from a plurality of sources within the mobile communication network, wherein the plurality of sources may be located in different domains of the mobile communication network. In the case of FIG. 3, the different domains may be the RAN, the user plane of the CN, and the control plane of the CN, for example.

As shown by numeral (4) in FIG. 3, another source of information which may be taken into consideration when determining the one or more performance indicators may be network configuration information available in the mobile communication network, such as configuration information provided by an Operation Support System (OSS) or a network management system, such as an Ericsson Network Manager (ENM), for example. The one or more performance indicators may thus alternatively or additionally be determined based on network configuration information available in the mobile communication network.

When QoE degradation is detected, corresponding incidents may be reported to the OSS and/or the network management system, which may then initiate appropriate corrective actions to resolve the QoE degradation, for example. The method performed by the computing unit 100 may thus further comprise triggering performing one or more corrective actions to resolve the QoE degradation. The one or more corrective actions may include implementing a resource reallocation in at least one network domain in which of the root cause for the QoE degradation is identified, wherein the resource reallocation may be adapted to provide sufficient QoE for an orderly operation of the robotic application. The resource reallocation may particularly be implemented in order to decrease (or eliminate) a number of emergency stops performed by the robot, to increase a number of alternative trajectories calculable within a specific amount of time (e.g., within a set deadline), to decrease a reaction time of the robot, and to increase an available delay budget for performing corrective actions resolving the QoE degradation, for example.

When the root cause for the QoE degradation is an improper 5QI mapping, the issue may be resolved by changing the 5QI mapping. For example, when control messages are sent to the robot and the control messages are initially mapped to a value of 5QI=70 (corresponding to a QoS setting which ensures a 200 ms maximum delay in the network in accordance with 3GPP TS 23.501 v16.2.0, for example), but it then turns out that a 100 ms maximum delay is needed to provide sufficient end-to-end QoE, then the mapping may be automatically changed to a value of 5QI=69 (ensuring a 60 ms maximum delay in the network in accordance with 3GPP TS 23.501 v16.2.0, for example). When the root cause for the QoE degradation is an improper 5QI mapping, the one or more corrective actions may thus include changing the 5QI mapping to a value appropriate to provide sufficient QoE for an orderly operation of the robotic application. Changing a 5QI mapping may generally be a fast and simple way to improve QoE which is effective immediately as compared to handover and radio network optimizations, for example.

Figure 4:
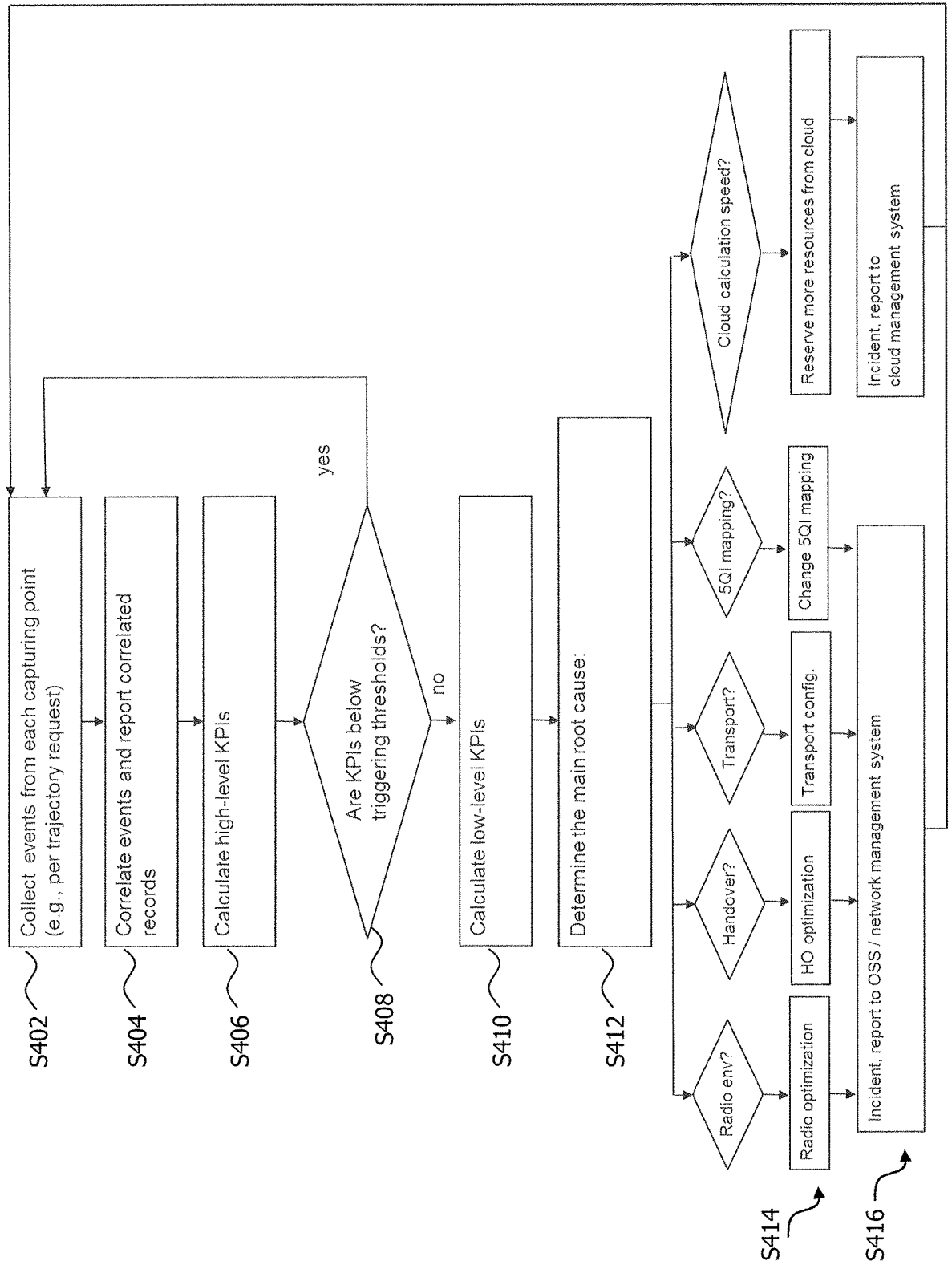
FIG. 4 illustrates an exemplary flowchart of a method which may be performed to analyze QoE of a delay critical robotic application according to the present disclosure.

FIG. 4 illustrates an exemplary flowchart of a method which may be performed to analyze QoE of a delay critical robot application in a cloud robotics system. In step S402, event information is collected from each capturing point within the mobile communication network, such as from the capturing reference points (1), (2) and (3) shown in FIG. 3. The event information may be collected by an analytics system (e.g., periodically or upon request, such as upon a request to calculate a trajectory for the robot), for example. In step S404, the event information may be correlated to obtain correlated event information. A robot control monitoring system or an external QoE monitoring system (indicated by numeral (5) in FIG. 3) which may provide information on the actual status of the robot may then calculate, in step S406, one or more high-level KPIs associated with the robotic application, e.g., based on the correlated event information. In step S408, it may then be checked whether the high-level KPIs trigger their corresponding thresholds to see whether QoE degradation is present (corresponding to step S202 described above) and, if so, one or more low-level KPIs may be calculated in step S410 (corresponding to step S204 described above), e.g., based on the correlated event information. Based on the one or more low-level KPIs, the root cause for the QoE degradation may then be identified in step S412.

As shown in FIG. 4, depending on the particular root cause identified in step S412, corresponding corrective actions may be triggered in step S414. For example, if the root cause is identified to be the radio environment, actions may be taken to improve the radio environment, if the root cause is identified to be related to handovers, actions may be taken to improve the handling of handovers, if the root cause is identified to be on transport level (e.g., user plane packet level transport), actions may be taken to improve a corresponding transport configuration, if the root cause is identified to be an improper 5QI mapping, actions may be taken to change the 5QI mapping to an appropriate value, and if the root cause is identified to be the cloud, actions may be taken to reserve more computational resources in the cloud for the robotic application. In step S416, corresponding incidents may be generated and reported to an OSS/network management system or to a cloud management system, respectively.

Although it will be understood that the technique presented herein may be applied in various use cases to assure sufficient QoE of delay critical robotic applications, in one particular use case, the technique may be implemented in a collision avoidance scenario when alternative trajectories are to be calculated for a robot. The service provided to the robot from the cloud may in this case include calculating detour trajectories avoiding impending collisions of the robot. As the quality of collision avoidance may be significantly affected by the quality of detours and the response times from the cloud (i.e., the times at which the detours become available to the robot), timely provision of the calculated detour trajectories to the robot may need to be ensured so that the robot receives a respective detour before reaching the starting point of the detour. To this end, for each detour trajectory among the detour trajectories to be calculated, a deadline (or "delay budget") may be determined (e.g., by the robot, before sending the request to calculate the detour trajectories to the cloud) indicating until when the calculated detour trajectory is to be provided to the robot. The possible delay in the cloud for the trajectory calculation may then be determined as $T_{cloud}$=total delay budget−2*delay on the radio interface−2*delay the CN.

In the rapidly changing environments, several detour options may need to be calculated and made available in advance and, to this end, when a potential collision is detected, the calculation of several detours may be initiated from different starting points on the currently executed trajectory of the robot. Each detour trajectory among the detour trajectories to be calculated may thus be defined to be started from a different starting point on a currently executed trajectory of the robot. The deadline for the respective detour trajectory may be prior to an expected time of reaching the starting point of the respective detour trajectory on the currently executed trajectory of the robot. For a given starting point, multiple detours with varying characteristics may be calculated. For each calculated detour trajectory, potential collisions may then be checked, e.g., by a dedicated object collision calculation function, and colliding routes may be rejected. The robot may discard a calculated detour trajectory when the deadline for providing the calculated detour trajectory to the robot is missed. The one or more corrective actions may generally be performed to ensure that the deadlines for the detour trajectories to be calculated are not to be missed.

Figure 5:
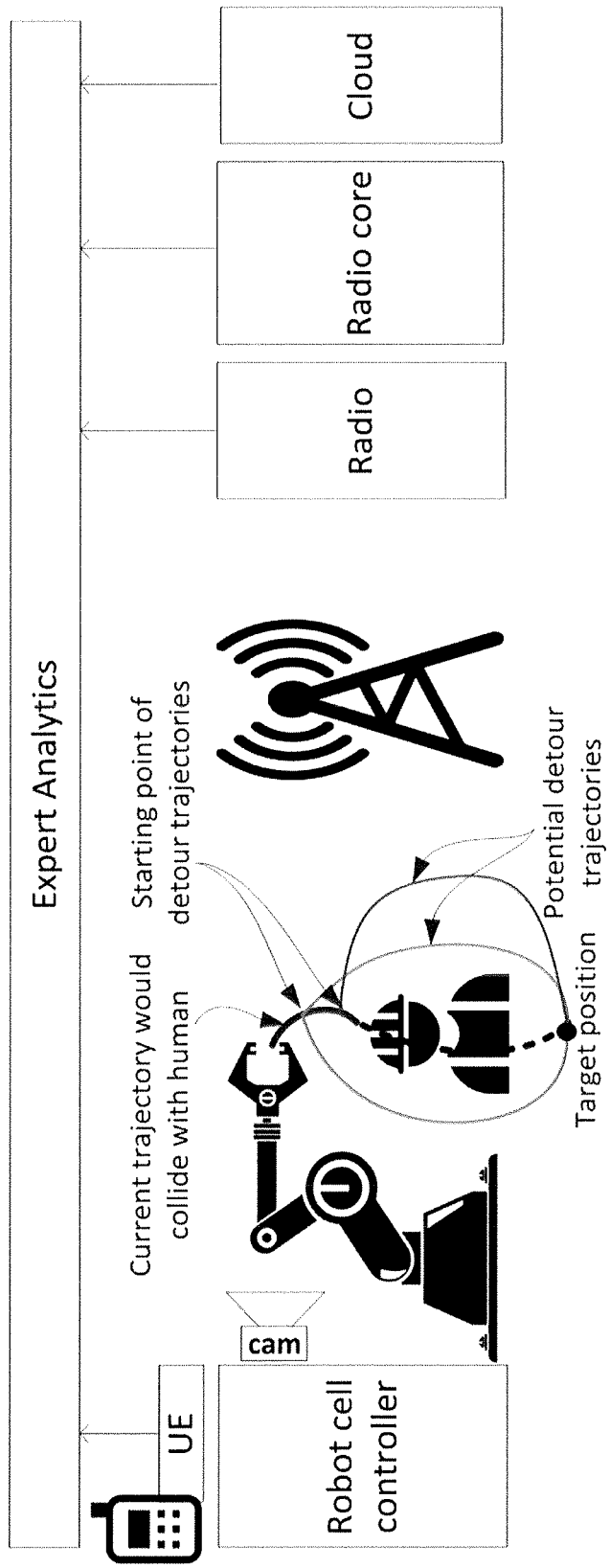
FIG. 5 illustrates an exemplary HRC use case in which alternative trajectories for a robot are calculated in a cloud according to the present disclosure.

FIG. 5 illustrates an exemplary HRC use case in which alternative trajectories for a robot are calculated in the cloud and in which the technique for analyzing QoE presented herein may be employed. According to the use case, a high-level robotic application may control a complex production environment, such as a robotic cell, containing, e.g., a robotic arm, conveyor belts moving workpieces, or other moving objects or humans. In the figure, an exemplary robot arm is depicted. In such a scenario, the high-level application may command the arm to move to a given position by a trajectory controller that invokes a trajectory generator to calculate an appropriate trajectory. Different constraints and goals may be given that impact the final path which is implemented by the cooperation of the trajectory executor and the low-level controller of the robot. The dynamic nature of the cell and, as shown in the figure, the collaboration with human workers may require revising the current trajectory in case of impending collisions. More specifically, if an object, such as the human, appears on the planned trajectory of the robot arm (e.g., detected by a camera), a detour may be calculated and executed (instead of the conservative treatment that stops the robot). Depending on the complexity of the cell, these calculations can be computationally intensive, especially in rapidly changing environments where it may be needed to have several detour options calculated and made available in advance. In the shown example, when a potential collision is detected, the calculation of several detour trajectories may be initiated from different starting points on the currently executed one and, from a given starting point, multiple options with varying characteristics may be calculated. In the example of FIG. 1, three detour trajectories are calculated from different starting points, wherein two different detour trajectories both starting from the first starting point are determined. Potential collisions may then be checked by a dedicated object collision calculation function, as described above. This calculation may be carried out for all segments of the given path and colliding ones may be rejected.

As said, collision and trajectory calculation may be computationally complex tasks, especially when multiple instances of these functions are executed in parallel to have several detour options calculated on time. Also, the performance of the overall cell may be significantly affected by the quality of the detours and the response times from the cloud. For example, if a detour option starting from the first starting point indicated in FIG. 5 is not available until the robot has reached the second shown position, the provided trajectory cannot be used anymore. According to the technique presented herein, it may be assured that the corresponding deadlines are met and that such situations do not occur, or at least occur less frequently.

Figure 6:
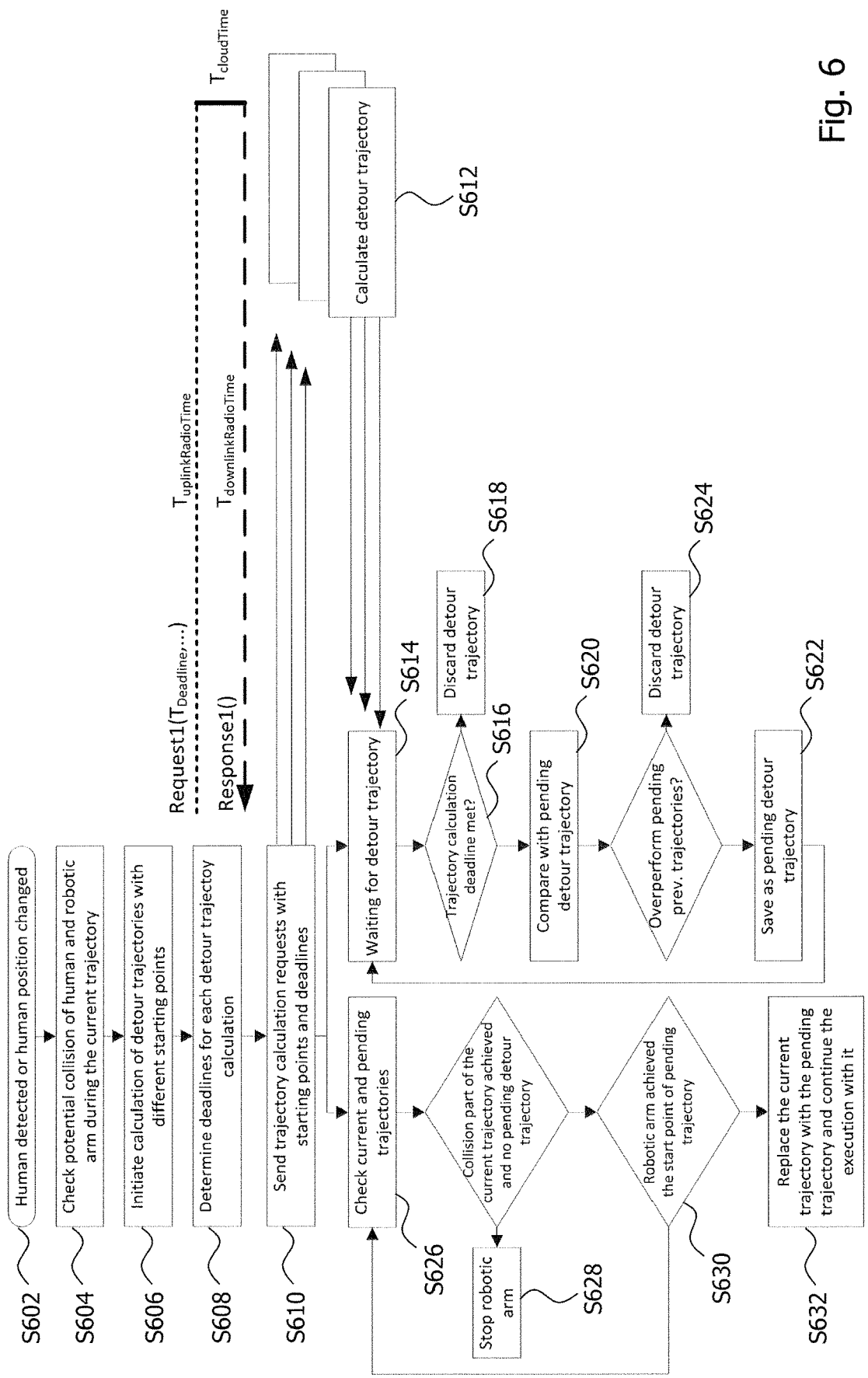
FIG. 6 illustrates an exemplary flowchart of a method which may be performed in accordance with the use case of FIG. 5.

FIG. 6 illustrates an exemplary flowchart of a method which may be performed in accordance with the use case described above in relation to FIG. 5. In step S602, a robot (or, more generally, a robot cell) may detect the presence of the human or a changed position of a human. In step S604, the robot may check a potential collision of the human with the robotic arm on the path of the trajectory currently being executed and, in case a potential collision is detected, the robot may initiate calculation of detour trajectories with different starting points in step S606. In step S608, the robot may determine deadlines for each detour trajectory to be calculated and may send, in step S610, corresponding trajectory calculation requests, including starting points and, optionally, deadlines, to the cloud, which then calculates the requested detour trajectories in step S612.

Upon sending the trajectory calculation request in step S610, the robot enters, in step S614, a loop in which the robot waits for the detour trajectories calculated by the cloud. For each incoming detour trajectory, the robot may check, in step S616 whether the respective trajectory calculation deadline is met. If the deadline is not met, the incoming detour trajectory may be discarded in step S618. Otherwise, the incoming detour trajectory may be compared with previously received detour trajectories in step S620 and, if the incoming trajectory overperforms previous trajectories, the robot may save the incoming detour trajectory as the currently pending (e.g., best) detour trajectory in step S622. Otherwise, the incoming detour trajectory may be discarded in step S624.

In step S626, the robot may check the currently executed trajectory and whether a pending detour trajectory has already been received. If the potential collision point of the currently executed trajectory is reached and a pending detour trajectories not yet available, the robot arm may be stopped in step S628. If, on the other hand, a pending detour trajectory is available, it may be checked whether the robot arm has already reached the starting point of the pending detour trajectory in step S630 and, if the starting point is not yet reached, the robot may replace the current trajectory with the pending detour trajectory and continue execution in accordance with the pending detour trajectory in step S632.

As has become apparent from the above, the present disclosure provides a technique for analyzing QoE of a delay critical robotic application in a cloud robotics system. The technique may be used to effectively assure QoE of deadline critical robotic services, particularly when alternative paths are calculated in a remote cloud system, taking into account the delay due to possible network related issues. The technique may empower collaborative robots with intelligence to plan trajectories carefully to avoid collisions while providing a desired productivity level and minimizing downtimes with non-productivity. While conventional analytics solutions for mobile networks do not provide any information effective or applicable to improve mission critical services with hard deadlines, the QoE metrics, KPIs and target optimization parameters of the presented analytics technique may specifically enable assuring QoE of latency critical robotic services.

The presented technique may be used to automatically identify and eliminate network related issues that affect delay critical robotic actions and may be used to analyze the corresponding root cause, classify the network related issues, and automatically take appropriate actions in different time scales and domains. For example, an issue may be resolved by changing the 5QI mapping, which may be a simple and cheap solution that may be implemented on a short time scale (e.g., within seconds) in the core and radio network domain. Transport issues in the core network, issues in the radio network, and cloud related capacity issues may be resolved in corresponding time scales as well, such as within minutes in case of a required resource reallocation in the cloud, for example.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for analyzing Quality of Experience (QoE) of a delay-critical robotic application in a cloud robotics system, the robotic application involving use of a cloud-based service by a robot, the service being provided to the robot from a cloud using a connection over a mobile communication network, the method comprising:
   triggering determining whether a QoE measure associated with the robotic application exceeds a threshold to assess whether QoE degradation is present; and
   when it is determined that QoE degradation is present, triggering identifying a root cause for the QoE degradation based on one or more performance indicators observed within the mobile communication network and associated with the connection.

2. The method of claim 1, wherein the QoE measure is determined based on information provided by a QoE monitoring system observing a performance of the robot.

3. The method of claim 1, wherein the QoE measure is representative of at least one of:
   an observed reaction time of the robot,
   an observed number of emergency stops of the robot caused by missed deadlines for calculating detour trajectories avoiding impending collisions of the robot, an observed number of detour trajectories calculable within a specific amount of time, optionally within deadlines for calculating detour trajectories avoiding impending collisions of the robot, and an observed available delay budget for performing corrective actions for resolving the QoE degradation.

4. The method of claim 1, wherein identifying the root cause for the QoE degradation includes determining, for at least one of the one or more performance indicators, whether the respective performance indicator exceeds a performance threshold.

5. The method of claim 1, wherein the one or more performance indicators are determined based on event information collected within the mobile communication network.

6. The method of claim 5, wherein the event information comprises performance related information concerning at least one of:
   a Radio Access Network (RAN) of the mobile communication network,
   a user plane of a Core Network (CN) of the mobile communication network,
   a control plane of the CN of the mobile communication network, and
   the cloud.

7. The method of claim 6, wherein the performance related information concerning the RAN comprises at least one of:
   radio condition related information,
   handover related information,
   context setup related information, and
   traffic report related information.

8. The method of claim 6, wherein the performance related information concerning the user plane of the CN comprises transport related information regarding at least one of:
   packet loss,
   round trip time, and
   jitter.

9. The method of claim 6, wherein the performance related information concerning the control plane of the CN comprises at least one of:
   session setup related information,
   5G Quality of Service Indicator (5QI)-related information,
   Cell Trace User Equipment Mapping (CTUM)-related information.

10. The method of claim 5, wherein collecting the event information includes correlating event information obtained from a plurality of sources within the mobile communication network, wherein the plurality of sources are located in different domains of the mobile communication network.

11. The method of claim 1, wherein the one or more performance indicators are determined based on network configuration information available in the mobile communication network.

12. The method of claim 1, further comprising:
   triggering performing one or more corrective actions to resolve the QoE degradation.

13. The method of claim 12, wherein the one or more corrective actions include implementing a resource reallocation in at least one network domain in which the root cause for the QoE degradation is identified, the resource reallocation being adapted to provide sufficient QoE for an orderly operation of the robotic application.

14. The method of claim 12, wherein, when the root cause for the QoE degradation is an improper 5QI mapping, the one or more corrective actions include changing the 5QI mapping to a value appropriate to provide sufficient QoE for an orderly operation of the robotic application.

15. The method of claim 1, wherein the service provided to the robot from the cloud includes calculating detour trajectories avoiding impending collisions of the robot.

16. The method of claim 15, wherein, for each detour trajectory among the detour trajectories to be calculated, a deadline is determined indicating until when the respective detour trajectory is to be provided to the robot.

17. The method of claim 16, wherein the robot discards the respective detour trajectory when the deadline for providing the respective detour trajectory to the robot is missed.

18. The method of claim 15, wherein each detour trajectory among the detour trajectories to be calculated is defined to be started from a different starting point on a currently executed trajectory of the robot.

19. The method of claim 18, wherein the deadline for the respective detour trajectory is prior to a time of reaching the starting point of the respective detour trajectory on the currently executed trajectory of the robot.

20. A computing unit for analyzing Quality of Experience (QoE) of a delay critical robotic application in a cloud robotics system, the robotic application involving use of a cloud-based service by a robot, the service being provided to the robot from a cloud using a connection over a mobile communication network, the computing unit comprising at least one processor and at least one memory, the at least one memory containing instructions executable by the at least one processor such that the computing unit is operable to:
   trigger determining whether a QoE measure associated with the robotic application exceeds a threshold to assess whether QoE degradation is present; and
   when it is determined that QoE degradation is present, trigger identifying a root cause for the QoE degradation based on one or more performance indicators observed within the mobile communication network and associated with the connection.

* * * * *